United States Patent

Chinazzo

(10) Patent No.: US 12,464,608 B2
(45) Date of Patent: Nov. 4, 2025

(54) COMBINED INDUCTOR SHIELDING SYSTEM

(71) Applicant: WHIRLPOOL CORPORATION, Benton Harbor, MI (US)

(72) Inventor: Fabiano Chinazzo, Cassinetta (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 942 days.

(21) Appl. No.: 17/543,104

(22) Filed: Dec. 6, 2021

(65) Prior Publication Data

US 2023/0180355 A1    Jun. 8, 2023

(51) Int. Cl.
 H05B 6/12    (2006.01)
 H05B 6/36    (2006.01)
 H05K 9/00    (2006.01)

(52) U.S. Cl.
 CPC ........... H05B 6/1245 (2013.01); H05B 6/365 (2013.01); H05K 9/0073 (2013.01); H05B 6/1254 (2013.01)

(58) Field of Classification Search
 CPC .... H05B 6/1245; H05B 6/365; H05B 6/1254; H05K 9/0073
 See application file for complete search history.

(56) References Cited

U.S. PATENT DOCUMENTS 3,021,414 A * 2/1962 Sand .................... F24C 15/104
                                                      219/464.1
5,665,263 A    9/1997 Gaspard 2015/0114953 A1 * 4/2015 Suzuki ................ H05B 6/1263
                                                       219/620
2016/0374154 A1 * 12/2016 Viroli ....................... H02J 50/70
2019/0231939 A1 * 8/2019 Askem ..................... A61M 1/96
2019/0342953 A1   11/2019 Nam et al.
2020/0100332 A1    3/2020 Noshita et al.
2020/0187312 A1 * 6/2020 Verdoliva ............. F16B 21/082

FOREIGN PATENT DOCUMENTS

| CN | 106304452 A | 1/2017 | |
| CN | 207201021 U | 4/2018 | |
| DE | 102016208233 A1 | 11/2017 | |
| EP | 1420614 A1 * | 5/2004 | .......... H05B 6/1254 |
| EP | 1991030 A2 | 11/2008 | |
| FR | 2744589 A1 | 8/1997 | |
| KR | 102165570 B1 | 10/2020 | |

OTHER PUBLICATIONS

EP 1420614 translation (Year: 2024).*

* cited by examiner

*Primary Examiner* — Elizabeth M Kerr
*Assistant Examiner* — Keith Brian Assante
(74) *Attorney, Agent, or Firm* — Brooks Kushman, P.C.

(57) ABSTRACT

An inductive cooking combined shield configured to be arranged below a cooking coil winding may include a plurality of ferrite bars and a plurality of elements made of a second material alternatively arranged in a plane so that to create a complementary electromagnetic shielding that extends from the center of the coil to the perimeter and has a modular structure that allows to block and/or to mitigate undesired macro eddy currents generated by the electromagnetic flux produced by the current flowing inside the winding.

14 Claims, 6 Drawing Sheets

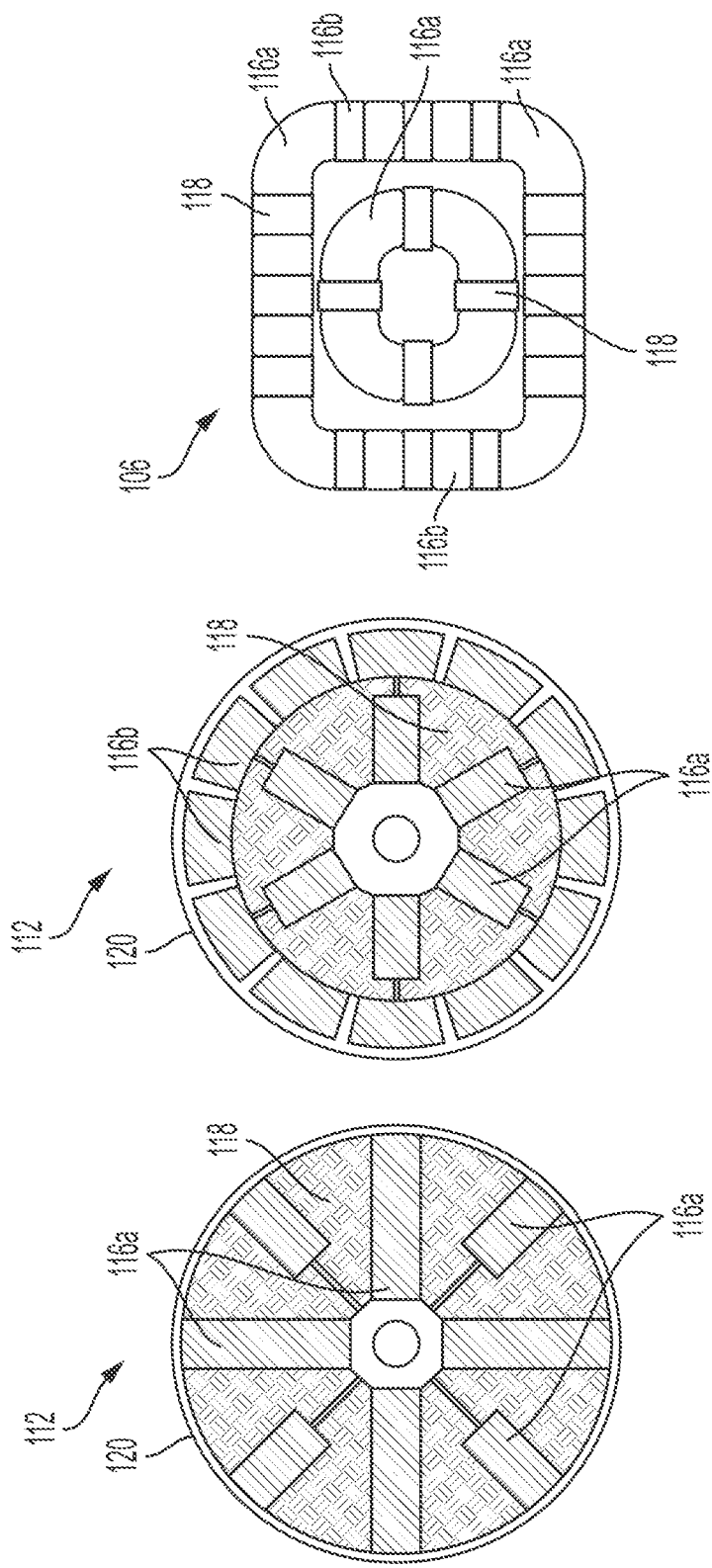

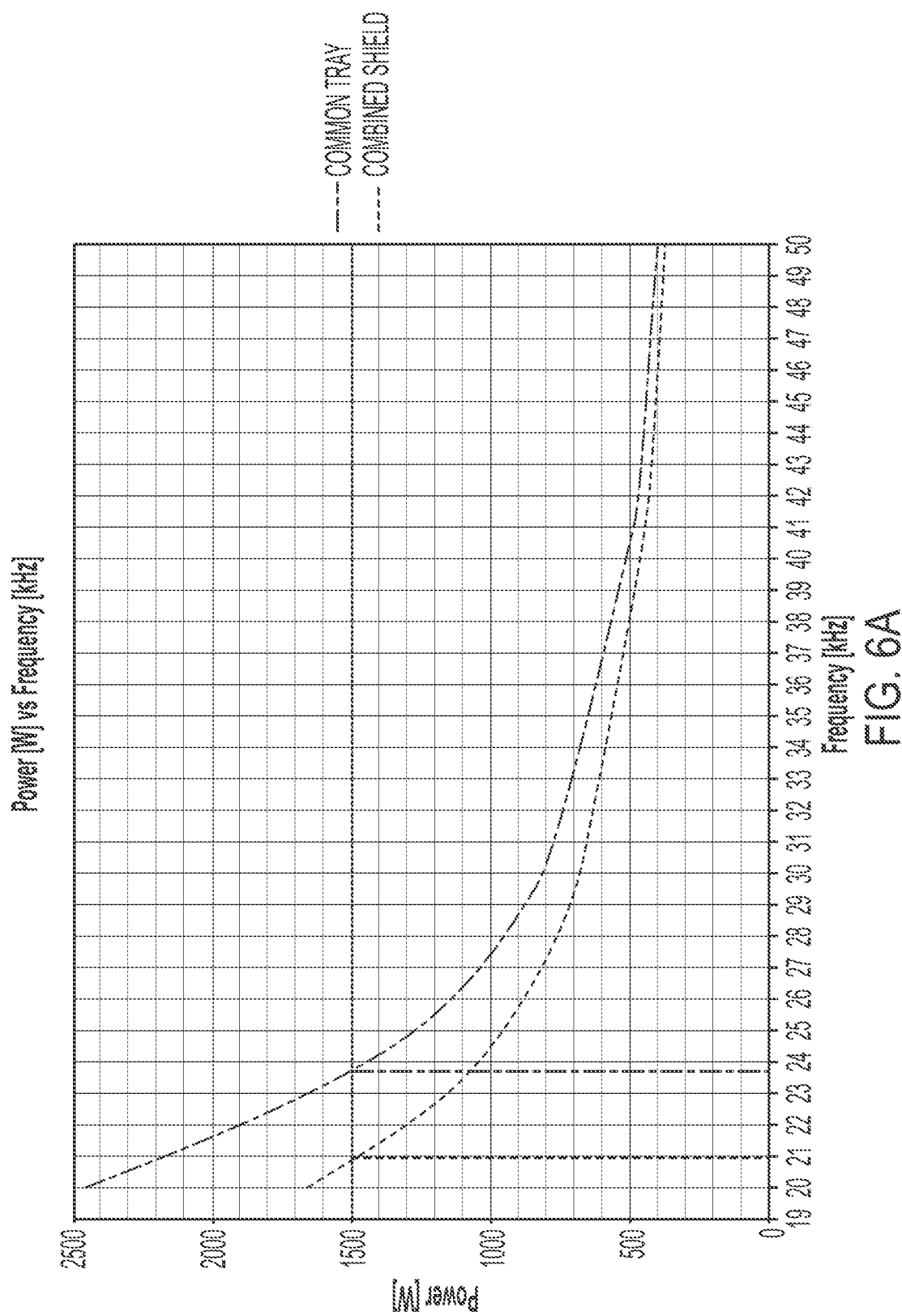

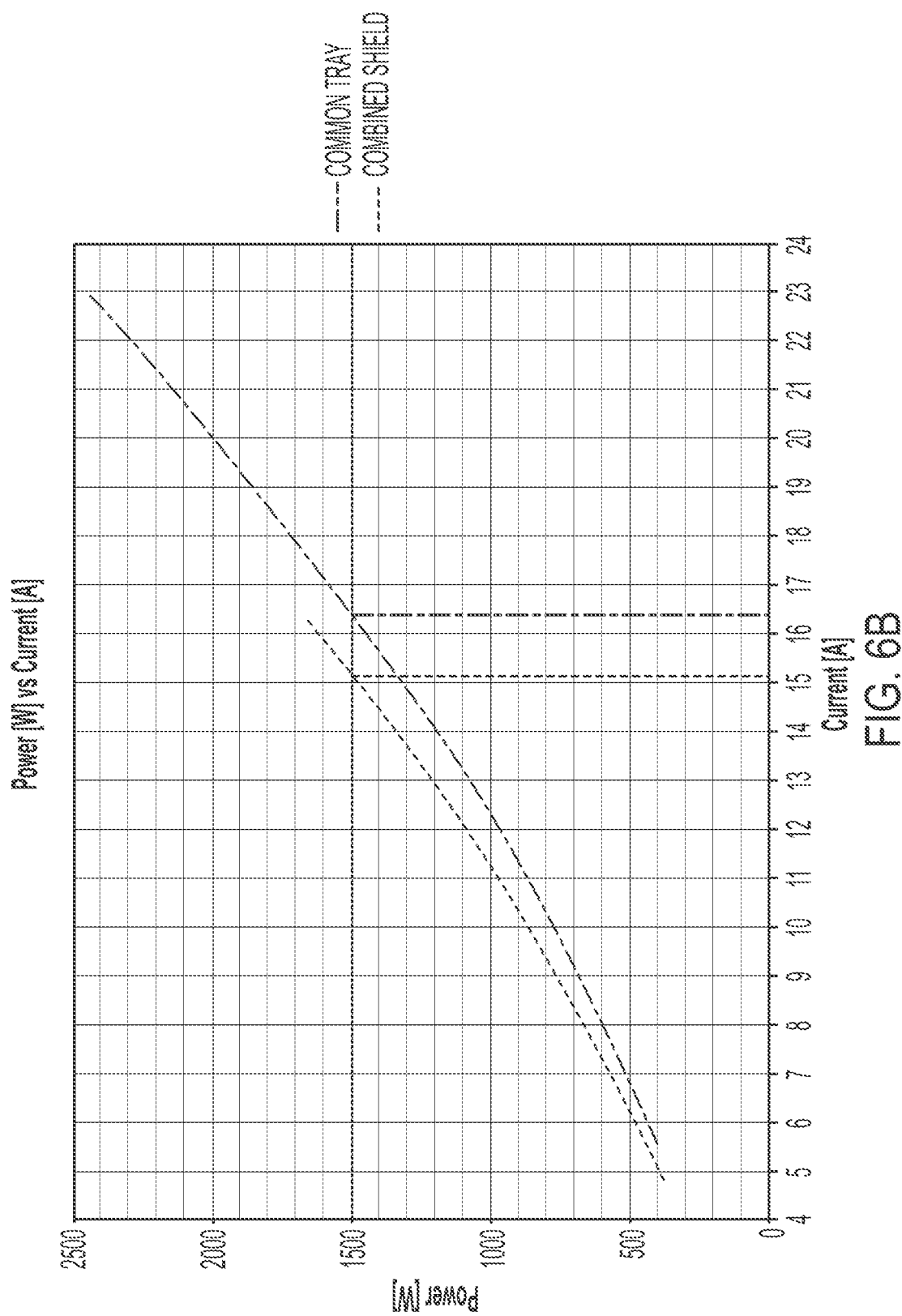

COMBINED INDUCTOR SHIELDING SYSTEM

TECHNICAL FIELD

Disclosed herein are inductor shielding systems for use in induction cooktop appliances.

BACKGROUND

Induction cooking appliances use induction coils to heat items directly. For instance, the induction coils may directly heat pots and pans through magnetic induction. An electric current is passed through the coil underneath the surface, creating a magnetic current throughout the pot or pan above to produce heat. Thus, as opposed to other types of cooking appliances, the surface of induction cooking appliances stays relatively cool while maintaining a consistent temperature on pots and pans and delivering power with a higher efficiency.

SUMMARY

An inductive cooking shield configured to be arranged below a cooking coil winding designed for half-bridge, full-bridge and quasi resonant topologies may include a plurality of ferrite bars arranged at least in one plane that configured to provides magnetic coverage; and a plurality of second elements made of a second shielding material complementary arranged to the ferrite bars that acts as a secondary shield and provides electromagnetic coverage from induced flux generated by the current circulating inside the coil winding.

A shielded coil assembly may include a cooking coil for an inductive cooktop, and a shield including a plurality of ferrite bars arranged on an aluminum plate, at least a portion of the ferrite bars extending radially outwards in a plane from a center of the shield to facilitate magnetic coverage of the coil, and a second material radially arranged within the plane between the plurality of ferrite bars to block undesired macro eddy current created by the ferrite bars, wherein the ferrite bars and the second material extend to a same perimeter such that the second material prevents the flow of macro eddy currents within sections created by the ferrite bars as well as around the ferrite bars to another section.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4A illustrates a top view of another example electromagnetic shield;

FIG. 4B illustrates a top view of another example electromagnetic shield;

FIG. 4C illustrates a top view of another example electromagnetic shield designed for a squared shape coil;

FIG. 5A and FIG. 6A illustrate example charts illustrating the Power (W) vs. Frequency (kHz) of a coil with the common aluminum shield and the effect obtained with the same winding with the combined concept shield respectively for a quasi-resonant motor and for a half-bridge/full bridge topology; and FIG. 5B and FIG. 6B illustrate an example chart illustrating the Power (W) vs. Current (A) of a coil with the common aluminum shield and the effect obtained with the same winding with the combined concept shield respectively for a quasi-resonant motor and for a half-bridge/full bridge topology.

DETAILED DESCRIPTION

Figure 1:
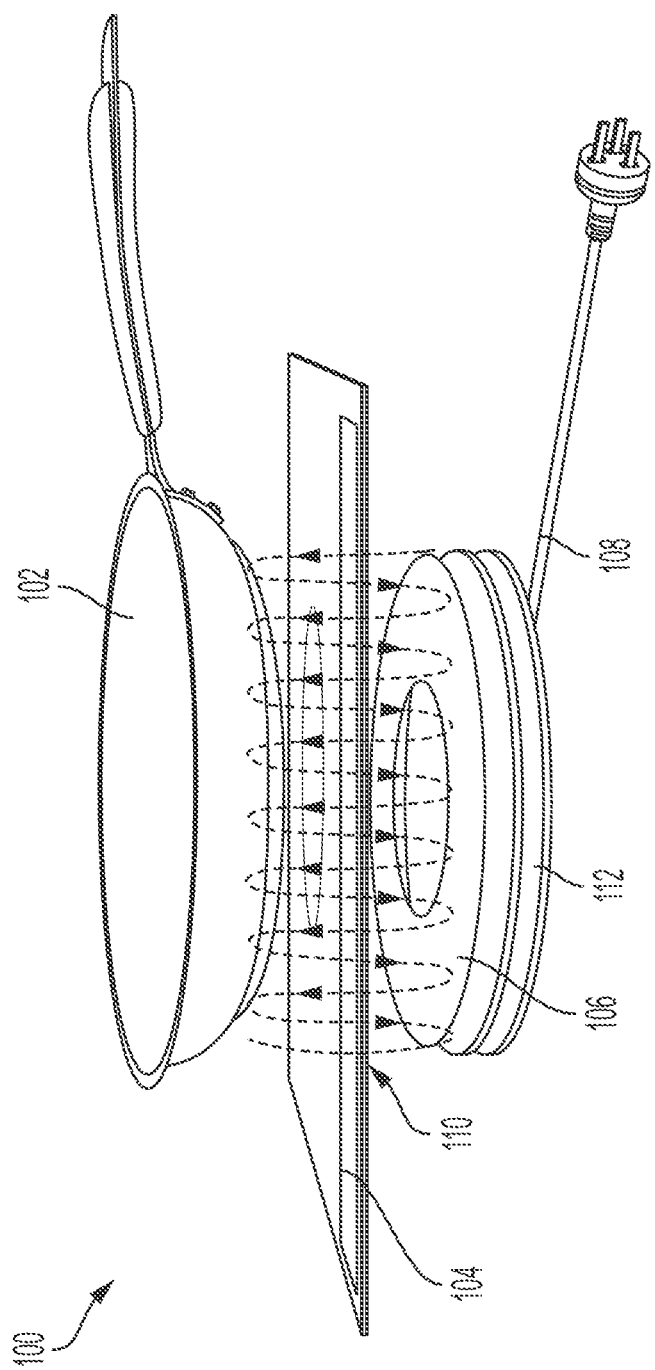
FIG. 1 illustrates a side view of an induction cooking system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Cooktops or other induction cooking appliances include induction coils, often referred to as pancake coils due to their structure. When powered, these coils create a magnetic field, which in turn, can be used to heat up a cooking vessel or other cooking item formed of ferromagnetic material placed on the cooktop. The cooking item may be referred to herein as a load. When an alternating current (AC) passes through the winding, the current creates a magnetic field that induces an eddy current into the load, thus heating up the bottom of the load due to the Joule effect. Spacers or mica layers are used between the coil winding and the surface to create a distance and an electrical insulation with the glass surface. This distance also guarantees inductor thermal insulation and provides the required safety to customers.

In order to improve the magnetic coupling between the coil winding and the load and reduce magnetic interferences with other electrical devices, ferrite bars may be included within the coil pancake to convey the magnetic flux. An aluminum plate may be placed below the coil to act as an additional electromagnetic shield. The aluminum plate may also mechanically support the coil. The aluminum plate may define a plurality of holes to aid in cooling the coil. In some examples, the holes may be placed at or near the corners of the ferrite bars.

Each coil may be specified according to design requirements to deliver a specified booster power for a limited time and a continuous nominal power for standard cooking. Other requirements regarding current density, minimum power, cooking performance, etc., may also be imposed on the induction system. However, the presence of eddy current circulation within the aluminum coil support may reduce the ability of the coil to meet the design requirements.

Described herein is an improved electromagnetic shield combination including the traditional soft ferrite bars and a plurality of elements made of a second material, such as aluminum plates or other plates made of soft magnet (or iron powder) and plastic (plasto-ferrite) or rubber and iron powder melt. The ferrite bars and the second material may be arranged in an alternate arrangement and designed to cover an entire coil winding area that may be of a variable shape. This improved shield design allows for full magnetic coverage, preserving the components mounted on the electronic board from electromagnetic noise, while being able to block undesired macro eddy currents circulation in the common aluminum coil support. Thus, the secondary, and unwanted, load is not electrically recognized and supplied by the coil system, keeping the coil more cool due to the reduction of eddy current loss. This further reduces performance deterioration of the ferrite bars that may occur with higher temperatures.

FIG. 1 illustrates a side view of an induction cooking system 100. The system 100 may be an induction cooktop configured to generate an electromagnetic field to rapidly and directly heat a load 102 placed thereon. The load may be any type of cooking vessel or other cooking item configured to conduct and withstand high heat, such as a pot, pan, griddle, etc. In the examples discussed herein, the load is made of metal, and more specifically a metal containing iron, such as a stainless steel cooking item. However, other highly magnetic metals may additionally or alternately be used. The system 100 may include a cooktop surface 104 for receiving the load 102. The cooktop surface 104 may be formed of glass, ceramic, or another high-heat resistant surface.

An induction coil winding 106 is arranged below the cooktop surface 104. The induction coil 106 may be a copper coil or another material suitable for electric flux (such as aluminum or CCA, copper clamped aluminum, or other) configured to receive electrical current from a power source 108. The power source 108 may supply high frequency AC by an electronic board, in a range greater than 18 kHz. The alternating current may generate magnetic flux, creating an electromagnetic field 110 that causes electrons to vibrate within the load bottom 102. The vibrating electrons create heat, thus heating the bottom surface of the load 102. The load 102 may then heat the contents of the load 102 through conductive heat.

The electromagnetic field 110 is converted into thermal energy directly, creating an efficient heating mechanism. Because of the direct conversion, the amount of heat generated may be easily and effectively controlled by controlling the strength of the magnetic field. Further, because the load 102 is heated with a magnetic field, the cooktop surface 104 remains generally cool.

The electromagnetic field 110 may create eddy currents, which are loops of electrical current induced within conductors by a changing magnetic field in the conductor. Eddy currents flow perpendicular to the magnetic field and are generally proportional in magnitude to the magnetic field and the rate of change of flux. The eddy current creates a magnetic field that opposes the change in the magnetic field that created it and causes energy loss and heat.

During use, while the cooktop surface 104 may remain cool, the coil winding 106 may generate heat. The system 100 may include a shield 112 arranged below the coil winding 106 to disperse and prevent the coil winding 106 from becoming too hot. The shield 112 may structurally maintain the coil winding 106 within a cooktop assembly or cabinet. The shield 112 may reduce electromagnetic noise generated by the coil winding 106 and also acts as an electromagnetic barrier configured to block the eddy currents generated by coil winding 106.

Figure 2:
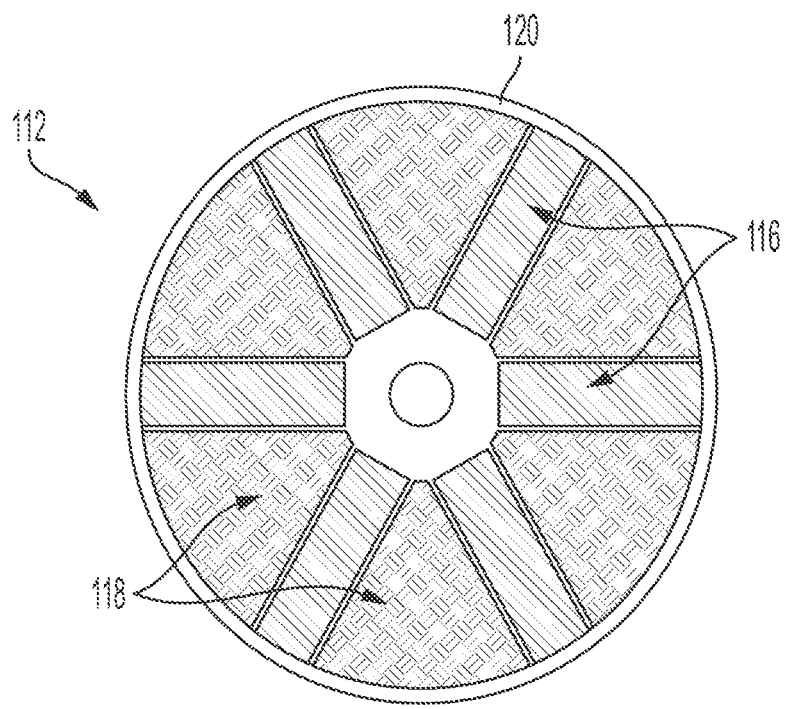
FIG. 2 illustrates a top view of an example electromagnetic shield.

FIG. 2 illustrates a top view of an example of a combined electromagnetic shield 112 of FIG. 1. The shield 112 may include a first material 116 (also referred to herein as ferrite bars 116 but other shapes are allowed) and a plurality of elements of a second material 118 arranged in a plane. The shield 112 may form a circular shape to align underneath the coil winding 106 (not shown in FIG. 2) but the same concept can be used for different shapes such as squared, oviform, rectangular, etc. depending on the heater shape. In this example, the plurality of bars 116 may be arranged in an alternate manner with the separated elements of the second material 118. For example, the bars 116 may extend outwardly from a center of the shield 112 to a perimeter 120 of the shield 112.

The first material 116 may be a ferrite material. These traditional ferrite bars 116 may be used to shield the electromagnetic flux generated by the coil winding 106. This field produces induced currents on the aluminum support, also known as eddy currents, that as explained above may result in a loss of electrical energy from heat causing magnetic flux leakage. By using the bars 116 to block and/or reflect the electromagnetic field, the leakage and energy loss is accordingly reduced.

The separated elements of the second material 118 may be arranged radially or in a complementary mode in the case of a coil with no circular shape within the plane and between each of the bars 116. In the example shown in FIG. 2, the second material 118 forms a wedge-like shape between the bars 116. The second material 118 can be an induction material suitable for shielding purposes such as, for example, aluminum, plastic melt with iron powder (plasto-ferrite), and/or rubber melt with soft-magnet powder, etc. The second material 118 may also include a melt or combination of the plastic, rubber, soft magnet iron powder and/or aluminum or other materials with electromagnetic shielding properties. In one example, the second material 118 may be modular aluminum plates placed between the bars 116. The bars 116 and the second material 118 may extend to the same perimeter 120. The shield 112 may include an aluminum plate to receive the bars 116 and second material 118 and define the perimeter. Additionally or alternatively, the bars 116 and second material 118 may form the shield 112 themselves. In case of full shield replacement, the aluminum mechanical support can be removed/avoided thus allowing a lower electrical distance required by standard between coil pancake and electronic board components with a global benefit of cooktop stack-up reduction.

Figure 3:
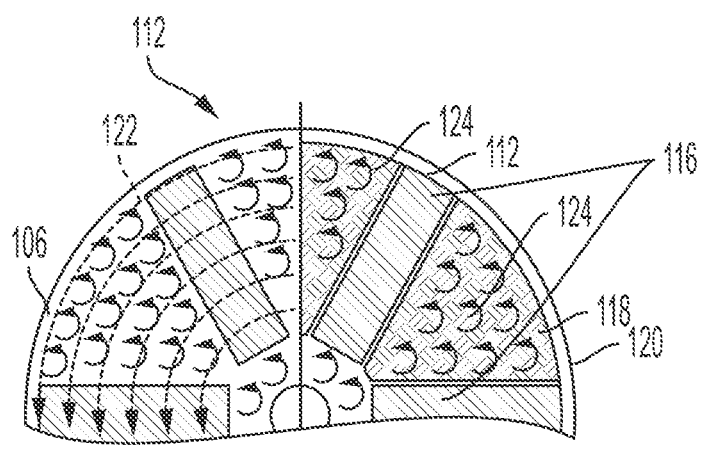
FIG. 3 illustrates a partial top view of an example electromagnetic shield.

FIG. 3 illustrates a partial top view of the example electromagnetic shield 112 illustrating the effect of the separated elements of the second material 118. As shown, FIG. 3 illustrates on the left side a portion with the common electromagnetic aluminum made shield 120 including the ferrite bars 116 and on the right side a portion of the shield 112 with separated elements of the second material 118 alternate to the usual ferrite bars 116 and mounted over a common no-metallic support. As indicated by arrows 122, in the aluminum shielding, the eddy current may be free of circulation within the aluminum shield 112 thus creating extended electron fluxes, called macro eddy current that may be large enough to counteract the electromagnetic field 110 of FIG. 1. As explained above, this may increase energy loss.

However, where the second material 118 is formed by a plurality of separated elements dispersed between the bars 116 and extends almost to the same perimeter 120 as the ferrite bars 116, the presence of separated elements of the second material 118 may prevent the circulation of the usual macro eddy currents. While some current, as indicated by arrows 124, may still circulate through the second material 118, the current does not leak across the shielding elements (ferrite bars 116 and second material 118). Instead, any micro eddy current is overwhelmingly retained between the bars 116 within the second material 118. These micro eddy currents affect the overall electromagnetic field 110 very minimally, if at all, and thus, the energy loss due to eddy currents is significantly reduced.

FIG. 4A illustrates a top view of another example electromagnetic shield 112. In this example, the bars 116 may extend radially outwardly from the center of the shield 112 (similar to the example shown in FIG. 2) but may be of varying length. For example, the bars 116 may include at least one first bar 116a having a first length and at least one second bar 116b having a second length. In similar concepts, bars can also be of two or more different lengths. The first length may be greater than the second length. In the example shown, the bars 116 may include four first bars 116a and four second bars 116b. The first bars 116a and second bars 116b may alternate around the shield 112. The second material 118 may extend to the same perimeter, similar to FIG. 2, to prevent current flow around the bars 116. All bars 116a and 116b are placed over a non-metallic plate 112 that also provides mechanical support to the elements of second material 118.

FIG. 4B illustrates a top view of another example electromagnetic shield 112. In this example, the bars 116 may include at least one first bar 116a extending radially outwardly from the center of the shield 112 and at least one second bar 116b extending around the perimeter 120 of the shield 112. The at least one second bar 116b may include a plurality of bars arranged around the perimeter 120 thus creating a kind of circular (or squared for different coil shape) ring in order to block current flow to the perimeter 120. The first bar 116a may include a plurality of first bars 116a extending at least partially along the shield 112. The second material 118 may be arranged between the first bars 116a and extend up to the external second bar group 116b.

FIG. 4C illustrates a top view of another example electromagnetic shield 112 designed for a squared winding 106. In this example, ferrite elements 116 can be of different shapes. In particular ferrite 116a are placed on heater corners while ferrite bars 116b are allocated on the linear sides of the winding 106. Depending on the winding 106 shape and turns distribution, the ferrite structure can create at least one squared ring. As for the circular concepts seen before, the elements of the second shielding material 118 are arranged alternatively to the ferrite 116a and 116b and they can be of different areas depending on the space that have to be electromagnetically covered between ferrites 116a and 116b. Besides, at least one plate can give mechanical support and a base for all elements 116a, 116b and 118. In the examples shown, the bars 116 are generally equidistantly spaced about the center and the perimeter. However, this equal spacing is not necessary and varying spaces between the bars 116 may be implemented, mainly for cases of square, oviform or rectangular coil winding 106 shapes. In addition to the various lengths and widths of the bars 116, the bars may also vary in height. The second material 118 may also vary in height that cannot necessarily be equal to ferrite bars 116. Additionally, the second material 118 may define various holes or openings. These openings may aid in cooling, as well as provide openings to fix to the coil 106.

The placement of separated elements of second material 118 can vary and not necessarily have to be aligned on the same plane coincident with the ferrite bars 116 bottom surface. Nevertheless, this location is preferred since it represents the greater distance available in the coil pancake structure in a surface where the force of electromagnetic flux lines is reduced, being this field inversely proportional to the distance.

The second material 118 may be fixed to the bars 116 by adhesives, such as glue but alternative methods are considered. For example, in the case of coils presenting a plastic career structure, some holes can be created in proximity of the bottom surface and second material elements 118, such as aluminum, can be inserted and fixed from the external perimeter or with alternative methods. Other methods can be the melting of portions of plastic career structure for final fixing purposes, the contemporary melting of plastic with plasto-ferrite elements and/or rubber or the melting of coil plastic career around the second element materials 118 during the forming process of the coil structure, etc. The components may also be fixed together via a mechanical connection such as by joining, snapping, etc. For example, the presence of a ferrite bar 116 with a slot can allow the insertion and fixing of at least one element of a second shielding material thus avoiding the usage of glue or other bonding methods. In another example, a frame may be arranged at the perimeter 120. The bars 116 and second material 118 may be inserted and/or arranged externally and the frame may be installed around the arrangement, allowing a friction fit between the components. A combination of glue, mechanical connections and friction fits may also be implemented. It may be used also a single nonmetallic structure that provides a common mechanical support FIG. 5A illustrates an example chart that compares the typical Power (W) vs. Frequency (kHz) curve of a coil 106 supplied by a quasi-resonant topology having on one side the single shield 112 and on the other hand the combined shield 112. A first curve 152 illustrates the power vs. frequency of the system 100 of FIG. 1 having the single aluminum tray shield 112 arranged below the coil winding 106. In this example, the system 100 reaches a power of 2100 W at approximately 30 kHz. A second curve 150 illustrates the power vs. frequency of the combined shielding made of a plurality of elements 118 arranged below the same coil winding 106. In this example, the same system reaches the same power level of 2100 W at approximately 27.5 kHz. Thus, the combined shield method allows for the same coil to reach the same power level with a much lower frequency.

FIG. 6A illustrates an example chart that compares the typical Power (W) vs. Frequency (kHz) curve of a coil 106 designed for half-bridge or full-bridge topologies where the typical bell-shape characteristic moves to the lower frequency range. Thus, given a desired working resonance frequency or power level, coil designer can reach the desired inductance with a reduced turns winding number versus the shielding method thus resulting in a cost saving opportunity. For the showed example, the same coil winding 106 is able to reach 1.5 kW at 23.7 kHz in case of common aluminum tray while, in case of combined shield, same power level is reached at 21 kHz that empirically allows to reduce at least one turn depending on the coil winding size.

Figure 5B:
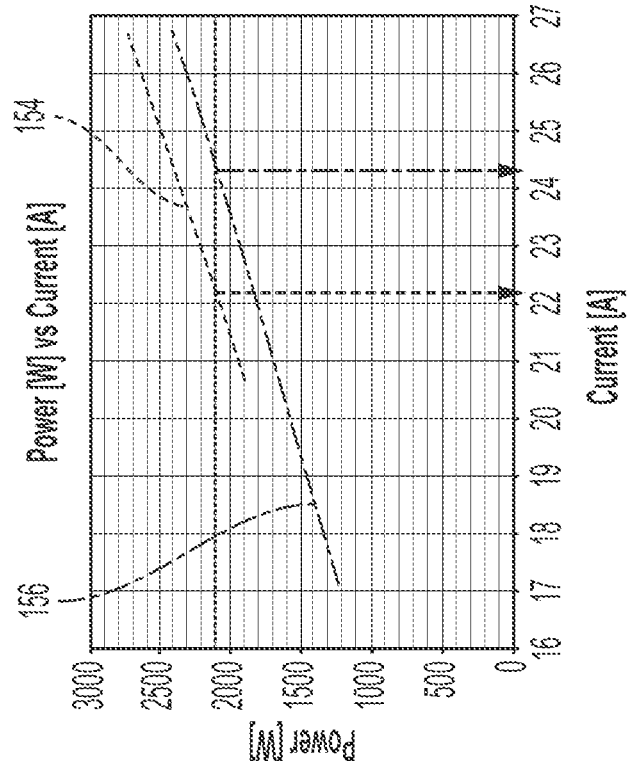
Figure 5A:
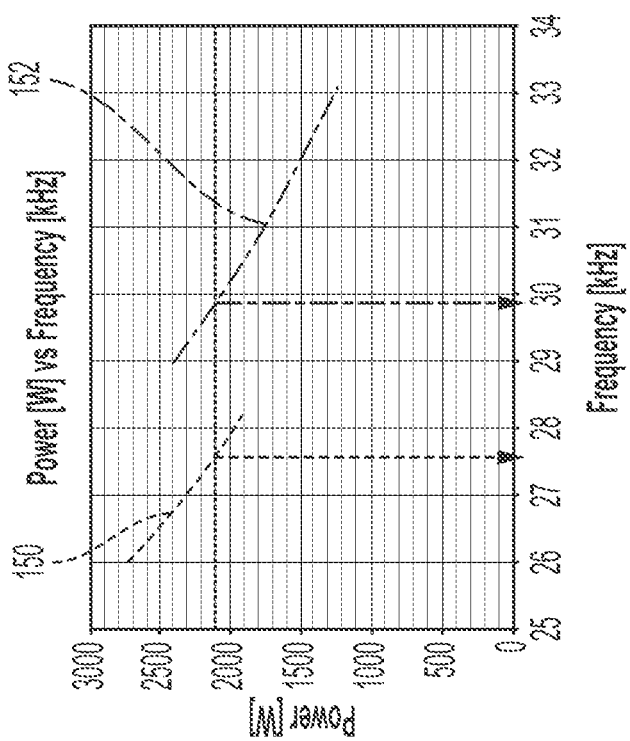

FIG. 5B is an example chart illustrating the Power (W) vs. Current (A) of a coil winding 106 with the shield 112 and the same coil winding 106 with the multiple elements shield concept. A first curve 156 illustrates the power vs. current of the system 100 of FIG. 1 having the aluminum tray shield 112 arranged below the coil 106. In this example, the system 100 reaches a power of 2100 W at approximately 24 A. A second curve 154 illustrates the power vs. current of the new solution arranged below the coil winding 106. In this case the same coil system reaches a power of 2100 W at approximately 22 A. Thus, the combined concept shield 112 allows for the same power level to be reached with a much lower current that reflects on reduced wire strand number (gauge) and cost.

FIG. 6B illustrates that the same benefit can be obtained also for coils designed for half-bridge or full-bridge topologies where the power characteristic moves to lower current range, gaining, in the illustrated example, around 1 A. This obtained reduction improves coil thermal behavior but also reduces dissipated heat inside the cooktop system. In other words, coil designers can reduce around 3-10% the wire gauge depending on coil size.

As explained, by achieving the same power with lower frequencies and currents, wire turns and strands may be reduced in the construction of the coil winding 106, thus decreasing the quantity of wire required to build the coil winding 106. This may turn into cost reduction. Further, reducing the current reduces wear and tear and strain on the system 100 in general. Specifically, where the system 100 includes an insulated-gate bipolar transistor (IGBT), the stress on the IGBT and capacitors may be reduced as the current is lowered and frequency is reduced.

Further, the minor current circulating in the coil winding 106 may generate for the Joule effect a lower thermal dissipation. The lower temperature allows the cooktop to cool more quickly and effectively. This allows for the need for high quality cooling components such as a fan, heatsink, IGBTs, capacitors, etc., to be reduced or eliminated. The estimated cost savings may be between 5-20% from using a lower quantity of materials while achieving the same results.

Further, with a lower current comes a lower magnetic field intensity to obtain the same results. This, in combination with the lower working temperatures, allows for a reduction of ferrite saturation phenomena. In turn, the quantity of ferrite bars 116 may be decreased, achieving additional cost savings. In addition to eliminating the macro eddy currents in the aluminum support, the current density near the ferrite corners also allows for a reduced dissipation of heat.

Accordingly, the shield 112 allows for full magnetic coverage and preservation of the board components from electromagnetic noise and undesired macro eddy current circulation in the aluminum coil support. The secondary unwanted load is not electrically recognized by the coil winding 106 system, allowing for reduced frequencies and currents. The heating capabilities remain the same, but the coil winding 106 may remain sufficiently cooler due to the reduction of the eddy current loss amount that happens on the aluminum tray.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive cooking shield configured to be arranged below a cooking coil winding designed for half-bridge, full-bridge and quasi resonant topologies, comprising:
   a plurality of ferrite bars arranged at least in one plane defined by a perimeter that is configured to provide magnetic coverage; and
   a plurality of second elements made of a second shielding material complementary arranged to the ferrite bars that acts as a secondary shield and provides electromagnetic coverage from induced flux generated by the current circulating inside the coil winding, wherein at least one of the second shielding materials defines a recess to form limited openings open at the perimeter to receive one of the ferrite bars within the recess.

2. The shield of claim 1, wherein the ferrite bars and the second shielding elements extend outwards to an external border bigger than a coil winding area such that the second material, being in distinguished elements physically separated, allows to reduce the path length of induced macro eddy currents.

3. The shield of claim 1, wherein the ferrite bars and the second shielding material are at least one of aluminum, plastic melt with iron powder (plasto-ferrite), rubber, soft magnet, or a combination thereof.

4. The shield of claim 1, wherein at least one ferrite bars or at least one of the second element are arranged on a common non metallic structure.

5. The shield of claim 4, wherein at least one of the ferrite bars defines at least one slot configured to receive a portion of at least one of the second elements.

6. The shield of claim 5, wherein the at least one ferrite bar and the at least one of the second element are attached to one another via a snap-fit.

7. The shield of claim 4, wherein at least one of the ferrite bars defines at least one slot where the at least one of the second elements are joined via melting after its collocation.

8. The shield of claim 4, wherein at least one of the ferrite bars defines at least one slot where at least one of the second elements are joined via melting during common structure creation.

9. The shield of claim 1, wherein at least one of the ferrite bars and at least one of the second elements are both arranged on a single non-metallic support that can be connected together to form a common single structure.

10. The shield of claim 9, wherein the at least one of the ferrite bars and the at least one of the second elements are of the same area.

11. The shield of claim 9, wherein the at least one of the ferrite bars and the at least one of the second elements are of different sizes.

12. The shield of claim 4, wherein the at least one of the ferrite bars and the at least one of the second elements are joined together via adhesives.

13. A shielded coil assembly, comprising:
   a cooking coil for an inductive cooktop; and
   a shield including:
      a plurality of ferrite bars arranged on a metallic plate, at least a portion of the ferrite bars extending radially outwards in a plane from a center of the shield to facilitate magnetic coverage of the coil, and
      a second material radially arranged within the plane between the plurality of ferrite bars to block undesired macro eddy current created by the coil winding, wherein the ferrite bars and the second material extend to a same perimeter such that the second material prevents the flow of macro eddy currents within sections created by the ferrite bars as well as around the ferrite bars to another section.

14. The shield of claim 13, wherein the second material is at least one of plastic, rubber or any non-metallic shielding elements or their combinations.

\* \* \* \* \*